(12) United States Patent
Wu

(10) Patent No.: US 10,111,552 B2
(45) Date of Patent: Oct. 30, 2018

(54) COMBINATION COOKER WITH SOUS VIDE FUNCTIONALITY

(71) Applicant: Anova Applied Electronics, Inc., San Francisco, CA (US)

(72) Inventor: Jeff Wu, Stafford, TX (US)

(73) Assignee: Anova Applied Electronics, Inc., San Francisco, CA (US)

( * ) Notice: Subject to any disclaimer, the term of this patent is extended or adjusted under 35 U.S.C. 154(b) by 0 days.

(21) Appl. No.: 14/727,444

(22) Filed: Jun. 1, 2015

(65) Prior Publication Data

US 2015/0342392 A1 Dec. 3, 2015

Related U.S. Application Data

(63) Continuation of application No. 14/491,961, filed on Sep. 19, 2014.

(60) Provisional application No. 61/880,714, filed on Sep. 20, 2013, provisional application No. 62/005,885, filed on May 30, 2014.

(51) Int. Cl.
| | |
|---|---|
| *A47J 27/62* | (2006.01) |
| *H05B 3/68* | (2006.01) |
| *H05B 6/12* | (2006.01) |
| *F24C 3/08* | (2006.01) |
| *A47J 36/16* | (2006.01) |

(52) U.S. Cl.
CPC .............. *A47J 27/62* (2013.01); *A47J 36/165* (2013.01); *F24C 3/085* (2013.01); *H05B 3/68* (2013.01); *H05B 6/1209* (2013.01)

(58) Field of Classification Search
CPC .......... A47J 27/10; A47J 27/62; A47J 36/165; H05B 3/68; H05B 6/1209; G05D 23/1917; G05D 15/02

USPC .......... 99/330, 331, 342, 343, 483; 219/429, 219/441, 627
See application file for complete search history.

(56) References Cited

U.S. PATENT DOCUMENTS

| | | | |
|---|---|---|---|
| 1,703,099 | A | 2/1929 | Craddock |
| 1,864,149 | A | 6/1932 | Rockwell |
| 2,140,315 | A | 12/1938 | Dollinger |
| 3,114,154 | A | 12/1963 | Laughlin |

(Continued)

FOREIGN PATENT DOCUMENTS

| | | |
|---|---|---|
| CN | 102192597 | 9/2011 |
| CN | 103211494 A | 7/2013 |

(Continued)

OTHER PUBLICATIONS

Extended European Search Report; European Application No. 15170168.7; dated Sep. 23, 2015.

(Continued)

*Primary Examiner* — Thien S Tran
(74) *Attorney, Agent, or Firm* — RatnerPrestia

(57) ABSTRACT

A multifunction cooking range with sous-vides functionality. Cooking ranges are found in every home and in every restaurant; with the addition of a high precision temperature controller attached to the heating elements, a fluidic temperature control device, the range can also be configured to enable sous-vide cooking. By using a pot filled with fluid located on a burner, the user would immerse a fluidic temperature control device in the pot while using the burner with a heating element that is modulated by the controller and temperature sensor.

14 Claims, 12 Drawing Sheets

(56) References Cited

U.S. PATENT DOCUMENTS

| | | |
|---|---|---|
| 3,270,661 A | 9/1966 | Alois |
| 3,273,717 A | 9/1966 | Canterbury |
| D214,165 S | 5/1969 | Sesholtz |
| 4,045,606 A | 8/1977 | Kalkowski |
| 4,099,406 A | 7/1978 | Fulkerson |
| 4,612,949 A | 9/1986 | Henson |
| 4,817,217 A | 4/1989 | Lively |
| 4,933,527 A | 6/1990 | Edamura |
| 4,993,593 A | 2/1991 | Fabiano |
| 5,146,840 A | 9/1992 | Hedenberg |
| 5,317,134 A | 5/1994 | Edamura |
| 5,321,229 A | 6/1994 | Holling |
| 5,336,401 A | 8/1994 | Tu |
| 5,368,384 A | 11/1994 | Duncan |
| 5,372,422 A | 12/1994 | Dubroy |
| 5,401,401 A | 3/1995 | Hickok |
| 5,412,171 A | 5/1995 | Yahav |
| 5,516,208 A | 5/1996 | Givant |
| 5,542,344 A | 8/1996 | Koether |
| 6,079,486 A | 6/2000 | Cennamo |
| 6,113,258 A | 9/2000 | Ardent |
| 6,286,990 B1 | 9/2001 | De Zuazo Torres |
| 6,539,842 B1 | 4/2003 | Chapman |
| 6,604,917 B2 | 8/2003 | Casper |
| 6,763,879 B1 | 7/2004 | Macheske et al. |
| 6,796,220 B2 | 9/2004 | Lee |
| 6,962,290 B2 | 11/2005 | Kwon |
| 7,026,929 B1 | 4/2006 | Wallace |
| 8,087,822 B2 | 1/2012 | Peng |
| 8,122,815 B2 | 2/2012 | Wolfe |
| 8,172,451 B2 | 5/2012 | Li |
| 8,218,402 B2 | 7/2012 | Lewis |
| 8,469,678 B2 | 6/2013 | Preston |
| 2004/0221736 A1 | 11/2004 | Park |
| 2004/0223404 A1 | 11/2004 | Hughes |
| 2005/0223910 A1 | 10/2005 | Hankinson |
| 2006/0239113 A1 | 10/2006 | Harris et al. |
| 2008/0066624 A1 | 3/2008 | Taylor |
| 2008/0136581 A1 | 6/2008 | Heilman et al. |
| 2008/0218493 A1 | 9/2008 | Patten et al. |
| 2008/0260557 A1 | 10/2008 | Austin |
| 2009/0087534 A1 | 4/2009 | McLemore |
| 2009/0093983 A1 | 4/2009 | Trafford |
| 2009/0120301 A1 | 5/2009 | Severnak |
| 2009/0153490 A1 | 6/2009 | Nymark |
| 2010/0090656 A1 | 4/2010 | Shearer |
| 2010/0154656 A1 | 6/2010 | Yamamoto |
| 2010/0199854 A1 | 8/2010 | Homme |
| 2011/0070340 A1 | 3/2011 | Pechaigner |
| 2011/0088564 A1 | 4/2011 | Bonsell |
| 2011/0117259 A1 | 5/2011 | Storek |
| 2011/0185915 A1 | 8/2011 | Eades |
| 2011/0186283 A1 | 8/2011 | Preston |
| 2011/0217439 A1 | 9/2011 | Morandotti |
| 2012/0053747 A1 | 3/2012 | Tanaka et al. |
| 2013/0091883 A1 | 4/2013 | Perez |
| 2013/0112683 A1* | 5/2013 | Hegedis ............... A47J 27/62 219/660 |
| 2013/0220143 A1* | 8/2013 | Fetterman ........... A47J 36/2405 99/330 |
| 2013/0302483 A1 | 11/2013 | Riefenstein |
| 2014/0026762 A1 | 1/2014 | Riefenstein |
| 2014/0208957 A1 | 7/2014 | Imai |
| 2014/0260998 A1 | 9/2014 | Pearson |
| 2014/0373723 A1 | 12/2014 | Vestreli |
| 2015/0064314 A1 | 3/2015 | Manuel |
| 2015/0257574 A1 | 9/2015 | Hoare |
| 2015/0265090 A1 | 9/2015 | Pennella |
| 2015/0289544 A1 | 10/2015 | Mendonça Vilela Pinto Ferreira |
| 2015/0335192 A1 | 11/2015 | Plazarte |
| 2016/0083048 A1 | 3/2016 | Munsch |
| 2016/0198883 A1 | 7/2016 | Wang |

FOREIGN PATENT DOCUMENTS

| | | |
|---|---|---|
| EP | 2354738 | 8/2011 |
| EP | 2407703 | 1/2012 |
| GB | 2260002 | 3/1993 |
| JP | S63196984 U | 12/1988 |
| JP | 2006334208 | 12/2006 |
| JP | 2008043502 | 2/2008 |
| KR | 20120049118 | 5/2012 |
| WO | 0152478 | 7/2001 |
| WO | 2004008923 A2 | 1/2004 |
| WO | 2012156890 | 11/2012 |
| WO | 2014019018 | 2/2014 |

OTHER PUBLICATIONS

Notification of Reason for Refusal dated Mar. 31, 2015; in Japanese patent application No. 2014-025539.

English abstract for JP2006334208; published Dec. 14, 2006.

English abstract for JP2008043502; published Feb. 28, 2008.

Notice of Allowance, U.S. Appl. No. 14/727,431, filed Jun. 1, 2015, entitled "Sous-Vide Cooker with Image Translation Functionality", 8 pages.

Non-Final Office Action, U.S. Appl. No. 141491,961, filed Jun. 1, 2015, entitled "Submersable Circulator Cooker", 10 pages.

The Second Chinese Office Action, dated Sep. 25, 2017, Application No. 201480051964.7, entitled "Heating Circulator", 3 pages.

Australian Examination Report, dated Oct. 4, 2017, Application No. 2014293183, entitled "Heating Circulator", 3 pages.

International Search Report and Written Opinion of the International Searching Authority for International Application No. PCT/US2014/047838, dated Jan. 21, 2015.

J. Kenji Lopez-Alt: "Is The Nomiku Portable Sopus-Vide Cooker The Solution We're Looking For?", Serious Eats, Jun. 28, 2012; 2 pages, downloaded at http://www/seriouseats.com/2012/06/is-the-nomiku-portable-sous-vide-cooker-the-s.html.

News Anova INc. Water Bath Company, May 7, 2014, 1 page, downloaded at http://www.waterbaths.com/news.html.

Studio Kitchen; "Anova Immersion Circulator", May 8, 2014, 8 pp, downloaded at http//www.studiokitchen.com/studio-kitchen/anova-immersion-circulator.

European Patent Office Extended Search Report dated May 14, 2014, for European Patent Application No. EP 14154528.2, 8 pages.

Austalian Examination Report for Australian Application No. 2014200334, dated Mar. 20, 2018, 4 pages.

European Communication for European Application No. 15192763.9, dated Mar. 23, 2018, 4 pages.

Extended European Communication for European Application No. 15170176.0, dated Sep. 21, 2015, 5 pages.

Extended European Search Report for European Application No. 15170175.2, dated Sep. 21, 2015.

Extended European Search Report dated Sep. 24, 2015, European Application No. 15170165.3, 5 pages.

Final Office Action for U.S. Appl. No. 14/727,402, dated Apr. 20, 2017, 8 pages.

Final Office Action for U.S. Appl. No. 14/885,845, dated Aug. 16, 2017, 10 pages.

Non Final Office Action for U.S. Appl. No. 14/491,961, dated Apr. 10, 2018, 8 pages.

Non Final Office Action for U.S. Appl. No. 14/727,402, dated Dec. 14, 2017, 12 pages.

Notice of Allowance for U.S. Appl. No. 14/491,961, dated Jan. 22, 2018, 10 pages.

Notice of Allowance for U.S. Appl. No. 14/727,431, dated Feb. 14, 2018, 9 pages.

Notice of Allowance for U.S. Appl. No. 14/727,431, dated Jun. 1, 2018, 8 pages.

Notice of Allowance for U.S. Appl. No. 14/727,402, dated Jul. 2, 2018, 6 pages.

European Communication Pursuant to Article 94(3) EPC for European Application No. 15170175.2, dated Jun. 8, 2018, 6 pages.

Chinese Office Action for Chinese Application No. 201510293958.9, dated Apr. 25, 2018, including English translation, 10 pages.

(56) References Cited

OTHER PUBLICATIONS

Final Office Action for U.S. Appl. No. 14/727,402, dated Apr. 20, 2018, 15 pages.
Final Office Action for U.S. Appl. No. 14/491,961, dated Jul. 16, 2018, 8 pages.
Non Final Office Action for U.S. Appl. No. 14/907,533, dated Aug. 9, 2018, 24 pages.
Non Final Office Action for U.S. Appl. No. 15/890,439, dated Aug. 9, 2018, 12 pages.

\* cited by examiner

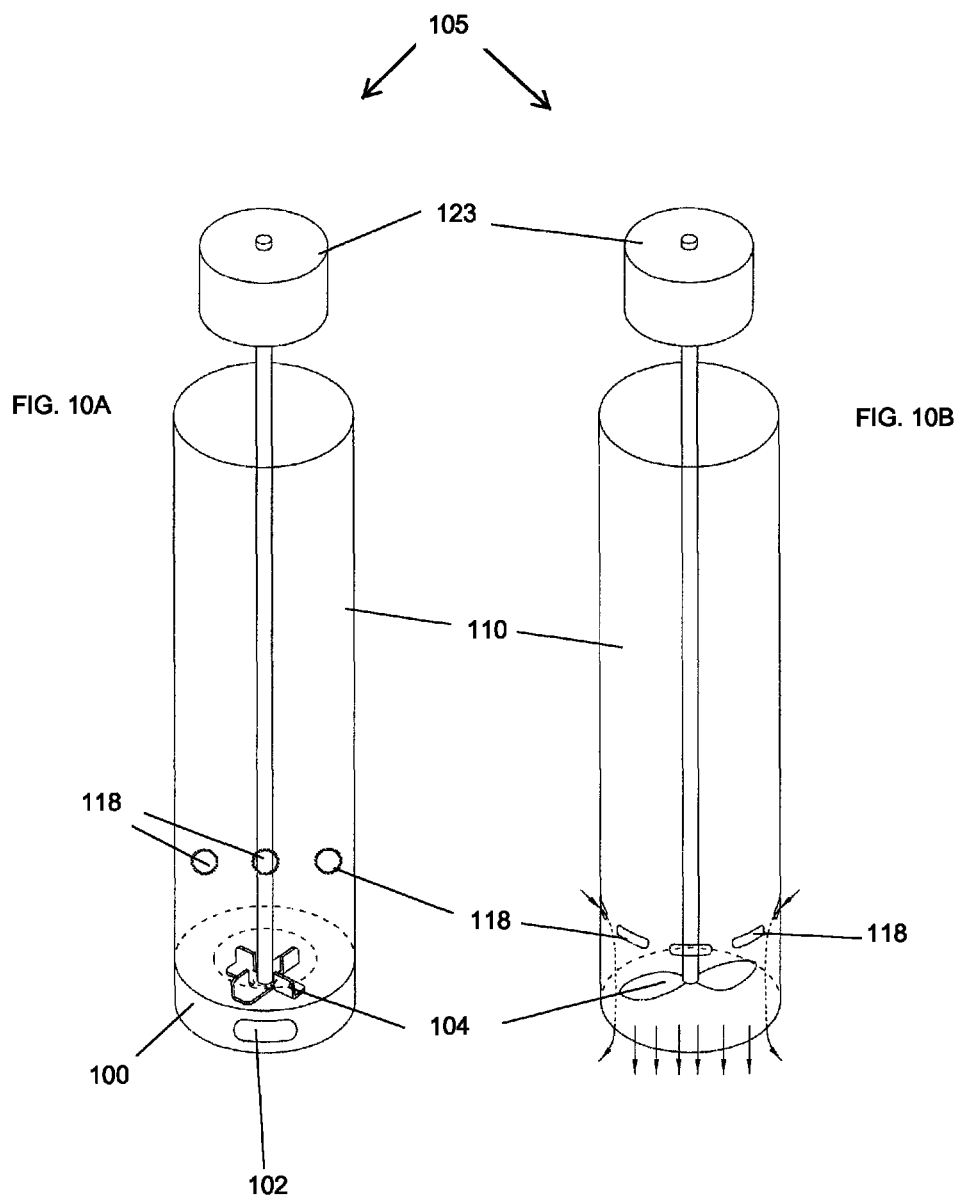

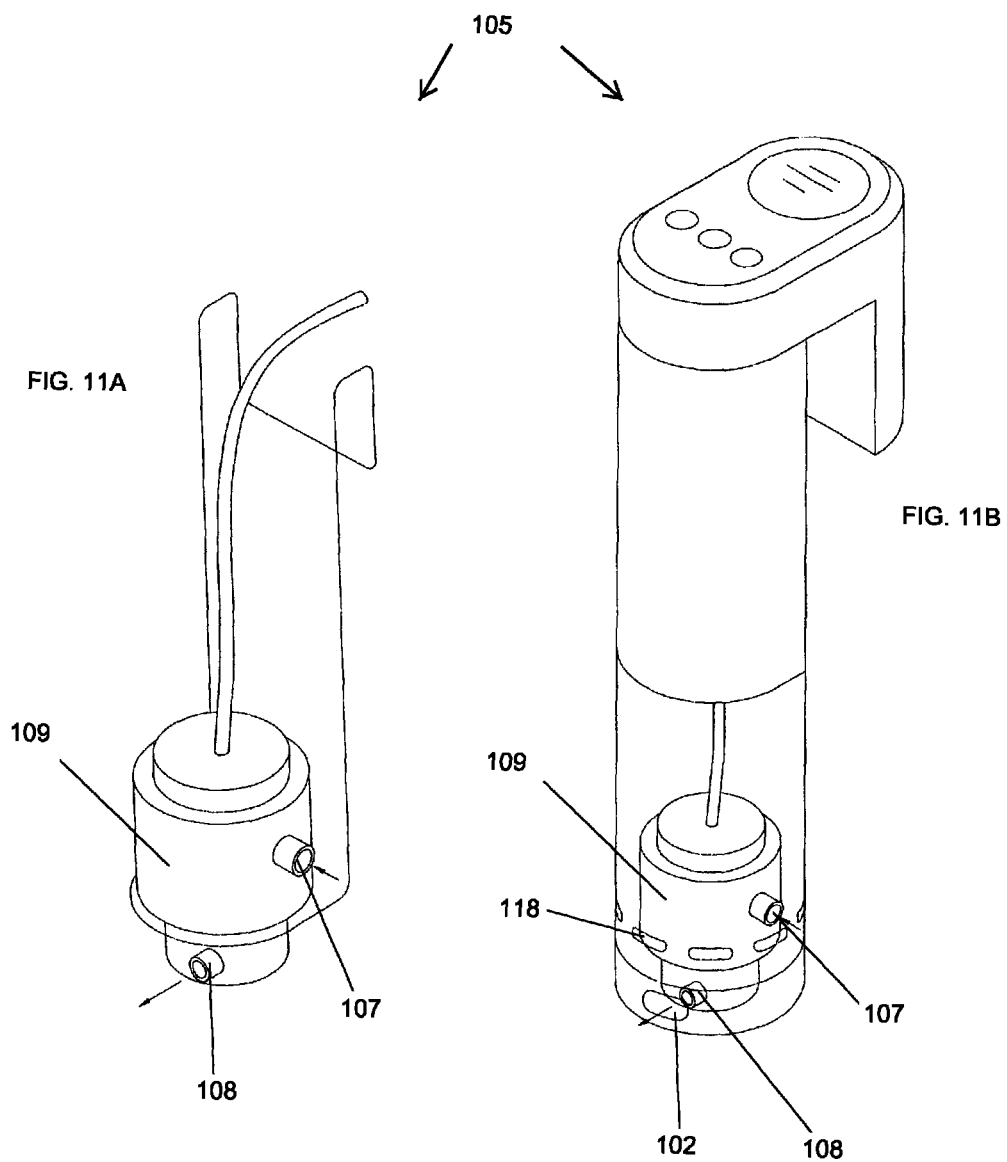

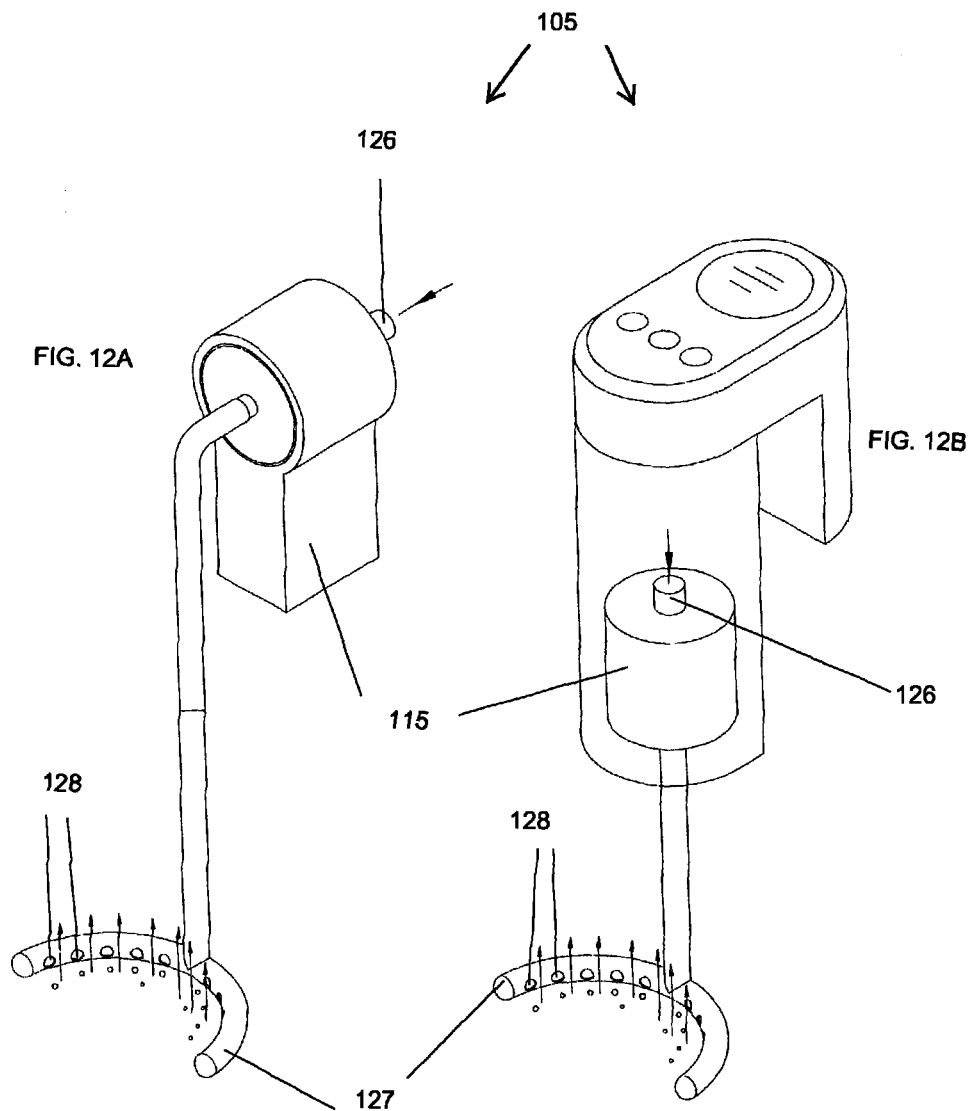

COMBINATION COOKER WITH SOUS VIDE FUNCTIONALITY

CROSS-REFERENCE TO RELATED APPLICATIONS

This application claims priority from U.S. provisional application No. 62/005,885 filed on May 30, 2014, the entire contents of which are incorporated by reference herein.

This application is also a continuation-in-part of U.S. application Ser. No. 14/491,961, filed on Sep. 19, 2014, which claims priority from U.S. provisional application No. 61/880,714, filed on Sep. 20, 2013, the entire contents of all of which are incorporated by reference herein.

FIELD OF TECHNOLOGY

The present disclosure relates generally to food cooking devices, and more specifically, to controlled cooking ranges for both domestic and commercial applications with sous vide functionality.

BACKGROUND

Sous-vide is a method of cooking food sealed in airtight plastic bags in a water bath for longer than normal cooking times at an accurately regulated temperature much lower than normally used for cooking, typically around 55° C. (131° F.) to 60° C. (140° F.) for meats and higher for vegetables. Current sous-vide equipment are built with singular sous vide functionality such as a thermal circulator or a temperature controlled water bath and cannot be used for conventional cooking.

Attempts to create sous vide apparatus out of conventional cooking equipment (crock pots, rice cookers, and slow cookers) where a temperature controller apparatus attempts to modulate a slow cooker's power source have been unsuccessful. Thus, there is room for improvement in the art.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings in which:

FIGS. 10A and 10B illustrates a fluidic temperature control device in accordance with an example embodiment;

FIGS. 11A and 11B illustrates a fluidic temperature control device in accordance with an example embodiment;

FIGS. 12A and 12B illustrates a fluidic temperature control device in accordance with an example embodiment;

DETAILED DESCRIPTION

Figure 1:
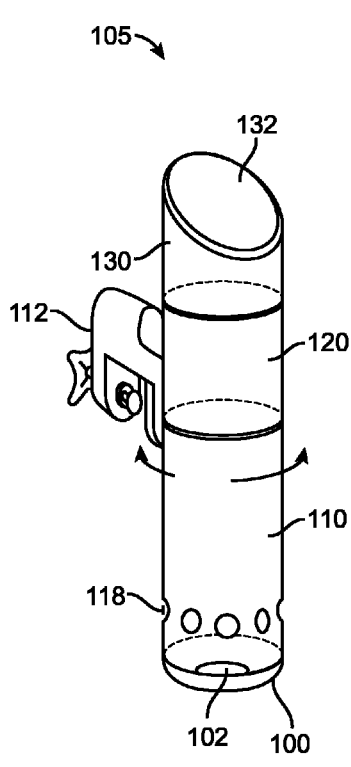
FIG. 1 illustrates a fluidic temperature control device in accordance with an example embodiment.

Several definitions that apply throughout this document will now be presented. "Circulating" means agitating, blending or mixing of one or more fluids. Hence a "circulator" is a device which can be configured to agitate, pump, air pump, blend or mix a fluid. Fluids will be understood to comprise liquids. "Coupled" is defined as connected, whether directly or indirectly through intervening components and is not necessarily limited to physical connections. Coupled devices are devices which are in signal communication with one another. "Connected" means directly connected or indirectly connected. "Sealed" can mean hermetically sealed, mechanically sealed or to make imperious to air and fluid.

Broadly speaking, this disclosure relates to sous-vide circulator cookers and cooking ranges for home sous-vide cooking. The disclosed devices are particularly suited for use in home kitchens, however, the devices are not limited to home kitchens and can be used in commercial environments. Aspects of this disclosure are directed to coupling sous vide cooking and the technique to the most common cooking device in the home, the cooking range. By modulating range power with a high precision controller, temperature sensor and a pump, sous vide cooking results can be achieved while utilizing the users own pots and range and the significant power output advantages the cooking range has leads to shorter heat up times.

The terms sous-vide, circulator, circulator cooker, fluidic temperature control device, and cooker are used interchangeably throughout this specification and each refers to a device configured to cook food in temperature controlled water bath.

In at least one embodiment, a fluidic temperature control device can have one or more turn-able or rotatable information displays. The display can be located on the top the cooker and can be configured to keep electronics housed therein away from steam, water and heat and to enable easy viewing from a plurality of different angles.

In at least one embodiment, a fluidic temperature control device can include a detachable skirt which enables cleaning of the skirt and cleaning of a heater, air pump, and/or water pump covered by the skirt. In at least one embodiment, the removable skirt can also expose the water pump impellers enabling a user to clean out food and debris. In at least one embodiment the skirt can be removed without tools. In at least one embodiment the skirt can be stainless steel, aluminum and/or plastic.

In at least one embodiment a fluidic temperature control device can have a water proof submersible pump in which the motor can be located under water, at the water line, or above water, with inflow and outflow lines. In at least one embodiment, the submersible pump can also be opened and/or accessed without tools for cleaning. In at least one embodiment, the fluidic temperature control device can be configured such that one or more motors of the device can be easily removed for cleaning or replacement.

In another embodiment, the entire circulator system can be sealed and can be submersed into water whether purposely or by accident, without damaging any components of the circulator system.

In at least one embodiment, a fluidic temperature control device can include a housing that defines the shape or form of the device. The housing can internally enclose and support various electrical components (for example, motors, fans, and/or electronics). In at least one embodiment, the housing can be cylindrical. In another embodiment, the housing can be a shape other than cylindrical, for example, rectangular, circular, square, or oval.

In at least one embodiment, a fluidic temperature control device for sous-vide cooking can include an upper portion including a controller, a display device and an input device coupled to the controller; a middle portion connected to the upper portion, the middle portion housing a motor coupled to the controller; a lower portion connected to the middle portion, the lower portion housing a fluid agitation device coupled to the motor, a heating element coupled to the controller, and the lower portion configured for at least partial immersion in a fluid. In at least one embodiment, the controller can be located in a cooking range. In at least one embodiment, the heating element is located in a cooking range.

In at least one embodiment, a fluidic temperature control device can include a clamp that enables an operator to secure the fluidic temperature control device to a container. In at least one embodiment, the clamp or other securement device can be configured to enable the height of the cooker to be adjusted with respect to the water bath or the chamber containing the bath, (for example, a cooking pot). In at least one embodiment, the sous-vide cooker can have a ring clamp that enables an operator to turn the entire system to vector the pump output or to turn the system for better display viewing angle.

In at least one embodiment, components of a fluidic temperature control device can be controlled by a remote device, for example, a phone, a server, a tablet, a Personal Computer (PC) or other electronic device. The remote device can be wirelessly and communicatively coupled to the cooker, for example, by Wi-fi, Bluetooth, Near Field Communication (NFC), short-range wireless or other similar system capable of sending and receiving data. In at least one embodiment, the fluidic temperature control device or the remote device controlling the fluidic temperature control device can be configured to wirelessly transmit information about cooking operations, such as a warning that additional water is required in the chamber cooking the food, or an alert indicating that cooking has been completed. In at least one embodiment, a fluidic temperature control device can receive recipe specifications from the remote device. The specifications can then direct the cook time, water pump speed, and cook temperature of the device.

In at least one embodiment, the fluidic temperature control device can include a memory storage unit. The memory storage unit can be used to store information such as favorite recipes and cooking parameters for certain foods. In at least one embodiment, a fluidic temperature control device can store a plurality of recipe specifications and user generated data files. Users of the device can recall recipe specifications from an internal recipe book. In at least one embodiment, the sous-vide circulator cooker can categorize stored recipe specifications and generated data files which can be searchable.

In at least one embodiment, a fluidic temperature control device can be configured to communicate with a wireless thermometer which can be placed in a bag or other suitable container containing food being cooked by the cooker, proximate the food. A thermometer located proximate the food can enable the cooker to have extremely accurate information about the temperature of the food being cooked. Accurate information regarding food temperature can enhance the quality of the cooked food and can aid in ensuring the food is properly and thoroughly cooked (thereby ensuring food safety). In at least one embodiment, the wireless thermometer can be inductively rechargeable.

In at least one embodiment, fluidic temperature control device can be constructed to protect electronic components of the device from environmental factors associated with cooking, for example, high temperatures, water, and steam. In at least one embodiment, one or more portions of the fluidic temperature control device can dynamically change color depending on operational state of the device. In at least one embodiment, the portions of the sealed housing are configured to change color and to provide information regarding an operational state of the device.

In at least one embodiment, the upper portion of the fluidic temperature control device can be configured to protect the controller, display device and input device from steam during use. In at least one embodiment, the agitation device can be an impeller, a propeller, a rotatable blade, a water pump or an air pump.

In at least one embodiment, the lower portion of the fluidic temperature control device or housing can be composed of at least stainless steel, aluminum or plastic, and is removable without tools. In at least one embodiment, the lower portion can contain slits or openings running along at least a portion of a length of the lower portion. In at least one embodiment, the lower portion can be removable from the middle portion and removal of the middle portion exposes the agitation device. In at least one embodiment, the upper portion of the fluidic temperature control device can be rotatable with respect to the middle portion.

In at least one embodiment, the heating element can be proximate the agitation device. Additionally, the heating element can be housed substantially within the agitation device. In at least one embodiment, the heating element can be located in a cooking range. In at least one embodiment, the controller can be configurable to control the temperature of the heating element. In at least one embodiment, the controller can be configurable to receive data inputted via the input device, the data comprising control commands to control the temperature of the heating element. In at least one embodiment, the controller can be located in the fluidic temperature control device. In at least one embodiment, the controller can be located in the cooking range. At least one embodiment of a fluidic temperature control device for sous-vide cooking can include an upper portion including a turn-able display and an input device coupled to the microprocessor controller; a middle portion connected to the upper portion, the middle portion housing a temperature controller controlled by the microprocessor; and a lower portion connected to the middle portion. The lower portion can house or encase a submersible fluid agitation device including impellers and motor, and a heating element coupled to the temperature controller, the lower portion configured for at least partial immersion in a fluid.

In at least one embodiment, the upper portion and middle portion can be sealed, thereby preventing water entry, thereby protecting electronics, the display and other electrical devices within the fluidic temperature control device. In at least one embodiment, the agitation device can be wholly or partially submersible. The agitation device can include a pump system having a motor and an impeller. The agitation device can also comprise a rotatable impeller blade. In at least one embodiment, the agitation device can also comprise a submersible pump.

In at least one embodiment, the lower portion can be configured to be removable from the middle portion such that removal of the lower portion exposes the agitation device and heaters. In at least one embodiment, the middle portion can have two adjustable electrodes that can sense the water level. In at least one embodiment, the lengths of the electrodes can be adjustable to enable detection of different water levels. In at least one embodiment, the electrodes can be configurable with attachments that enable adjustment of a length of the electrodes.

In at least one embodiment, the controller can be configurable to receive data inputted via the input device, the data comprising control commands to control the temperature of the heating element. In at least one embodiment, the temperature controller is configurable to control the temperature of the heating element. In at least one embodiment, the heating element is located proximate the agitation device. In at least one embodiment, the heating element is located in a cooking range.

At least one embodiment of a fluidic temperature control device can comprise a controller located in a sealed housing; a submersible pump connected to the sealed controller; adjustable electrodes to detect water level; and a ring clamp enabling the device to be turned.

In at least one embodiment, the entire device can be submersed in water without negatively impacting the operation of the system. In at least one embodiment, the submersible pump can be opened without tools to expose the impeller blades. In at least one embodiment, the submersible pump can include a barb located on the pump outlet containing a tube receiver.

In at least one embodiment, a combination cooking range device for both conventional and sous-vide precision cooking can include one or more heating burners or griddles located on the range, a high precision temperature controller including a heater controller for modulating heating power of the one or more heating burners or griddles, a display device and an input device coupled to the heater controller, a wired or wireless temperature sensor coupled to the heater controller and a fluid agitation device coupled to a motor.

In at least one embodiment, the combination cooking range device can be configured to operate both as a sous-vide precision cooker and a conventional stove top burner when the sous-vide attachment is not connected. In at least one embodiment, the combination cooking range can be standalone or can be imbedded into a counter.

In at least one embodiment, the heater controller can control one or more heating burners. In at least one example, the heater controller includes a wireless radio transmitter/receiver that can communicate with a computing device. The computing device can include a cellphone, computer, tablet, or any other computer device enabled to receive and transmit date.

In at least one embodiment, the one or more heating burners or griddles can include at least one of electric element, inductive element or gas element.

In at least one embodiment, the heater controller is connected to the wired or wireless temperature sensor and can modulate a temperature and heat output of the plurality of heating burners or griddles.

In at least one embodiment, the fluid agitation device can include at least one of motorized stirrer, pump, air pump or immersion pump. In at least one embodiment, the fluid agitation device and the motor can be designed for partial or full submersion into fluid.

In at least one embodiment, the combination cooking range device can include a releasably attached fluidic temperature control device which consists of a thermometer with a water pump that clips or clamps onto the side of a cooking container. The provision of the thermometer with a water pump can ensure that water temperature is measured inside the cooking container and can ensure adequate circulation for homogenous temperature distribution for sous vide cooking.

In at least embodiment the releasably attached fluidic temperature control device can be detached from the combination cooking range enabling the range to be controlled as a standard burner cooking surface. In another embodiment, the display device can be configured to change between sous-vide temperature read and/or standard cooking readouts of heat intensity.

In at least one embodiment a combination cooking range can comprise one or more burners, a fluidic temperature control device including, a heater controller, a temperature sensor and a fluid agitation device, wherein the fluidic temperature control device is releasably attached to a container, the temperature sensor configured to control the heater controller to modulate a heat output of the one or more burners and configured to actuate the fluid agitation device.

In at least one embodiment the combination cooking range can further comprising a display device and an input device coupled to the heater controller, wherein the display device can be configured to render a display of the temperature fluidic temperature control device or render a display of the heat output of the one or more burners.

In at least one embodiment the one or more burners of the combination cooking range can include at least one of electric element, inductive element or gas element.

In at least one embodiment the fluid agitation device the combination cooking range can include at least one of a motorized stirrer, a pump, an air pump or an immersion pump.

In at least one embodiment the fluid temperature control device is configured for partial or full submersion into a fluid of the container.

In at least one embodiment the fluidic temperature control device includes a wireless radio transmitter/receiver that can communicate with a computing device.

In at least one embodiment the fluidic temperature control device includes a clamp enabling attachment and removal from the container.

In at least one embodiment the combination cooking range can be standalone or can be imbedded into a counter. In at least one embodiment the heater controller can be used for controlling the one or more burners to increase heat output in response to the temperature sensor detecting a predefined temperature. In at least one embodiment, the heater controller can be used to control the one or more burners to decrease heat output in response to the temperature sensor detecting a predefined temperature.

In at least one embodiment, a fluidic temperature control device can be releasably attachable to a container, and can include a heater controller, a temperature sensor which is coupled to the heater controller, a fluid agitation device which is coupled to the heater controller and a first heating element. The temperature sensor can be configured to control the heater controller to modulate heat output of the heating element, and to actuate the fluid agitation device.

The heater controller can also be configurable to control the heater controller to modulate heat output of a heating element external to the fluidic temperature control device.

In at least one embodiment, the fluid agitation device configured to increase actuation speed in response to the temperature sensor detecting a predefined temperature. In at least one embodiment, the fluid agitation device configured to decrease actuation speed in response to the temperature sensor detecting a predefined temperature.

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Figure 2:
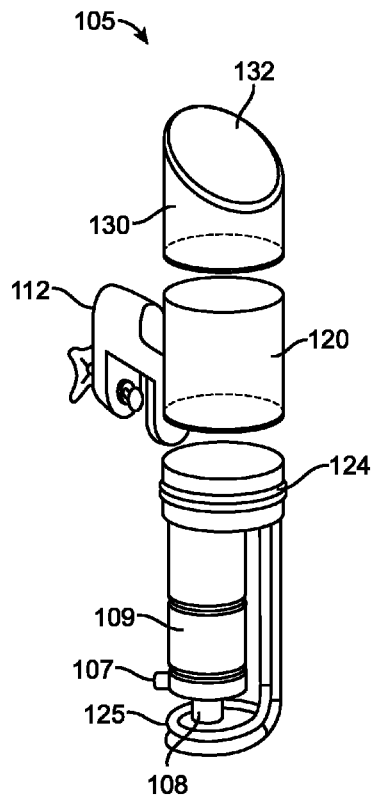
FIG. 2 illustrates a fluidic temperature control device in accordance with an example embodiment.

FIGS. 1 and 2 illustrate an example embodiment of a fluidic temperature control device 105. The temperature control device 105 comprises a upper portion 130, a middle portion 120 and a lower portion 110. In at least one embodiment, a fluidic temperature control device can include two portions: an upper and a lower. In at least embodiment, a fluidic temperature control device can include one portion. In at least one embodiment, a fluidic temperature control device can include one or more portions. The upper portion 130 can include a display device 132 which can display information, for example, the temperature of the fluid in which the lower portion 110 is at least partially immersed, the throughput at which intake and ejection ports are operating, or the speed at which an impeller housed within the lower portion is spinning. The upper portion 130 can also include an input device (not shown), for example, one or more buttons or controls which can enable a user to select a temperature for the water in which the lower portion is at least partially immersed. In at least one embodiment, the input device can include physical buttons and/or virtual buttons rendered on display device 132. The buttons or input controls can include capacitive sensor pads. The middle portion 120 can comprise a ring clamp 112 enabling attachment of control device 105 to a container, or the like. Middle portion 120 can include housing 124 for motor and heater base (not shown). Lower portion 110 can be configured with a cap 100 configured with one or more openings 102. Lower portion 110 can enclose submersible pump 109 with one or more liquid intake ports 107 and ejection ports 108. Alternatively, ports 108 can be fluid ejection ports and ports 107 can be fluid intake ports. The lower portion 110 can be configured with liquid intake (flow-in) openings 118 through which the heated water can be drawn by submersible pump 109, an impeller or other agitation device located within the lower portion 110 and ejected out of lower portion 110 through liquid ejection (flow-out) openings 102. Alternatively, openings 118 can be liquid output (flow-out) openings and openings 102 can be liquid intake (flow-in) openings. The lower portion 110 can included a thermometer device for taking the temperature of the fluid in which it is immersed. In another embodiment the thermometer can be separate device 105 and in wireless communication with device 105.

Figure 3:
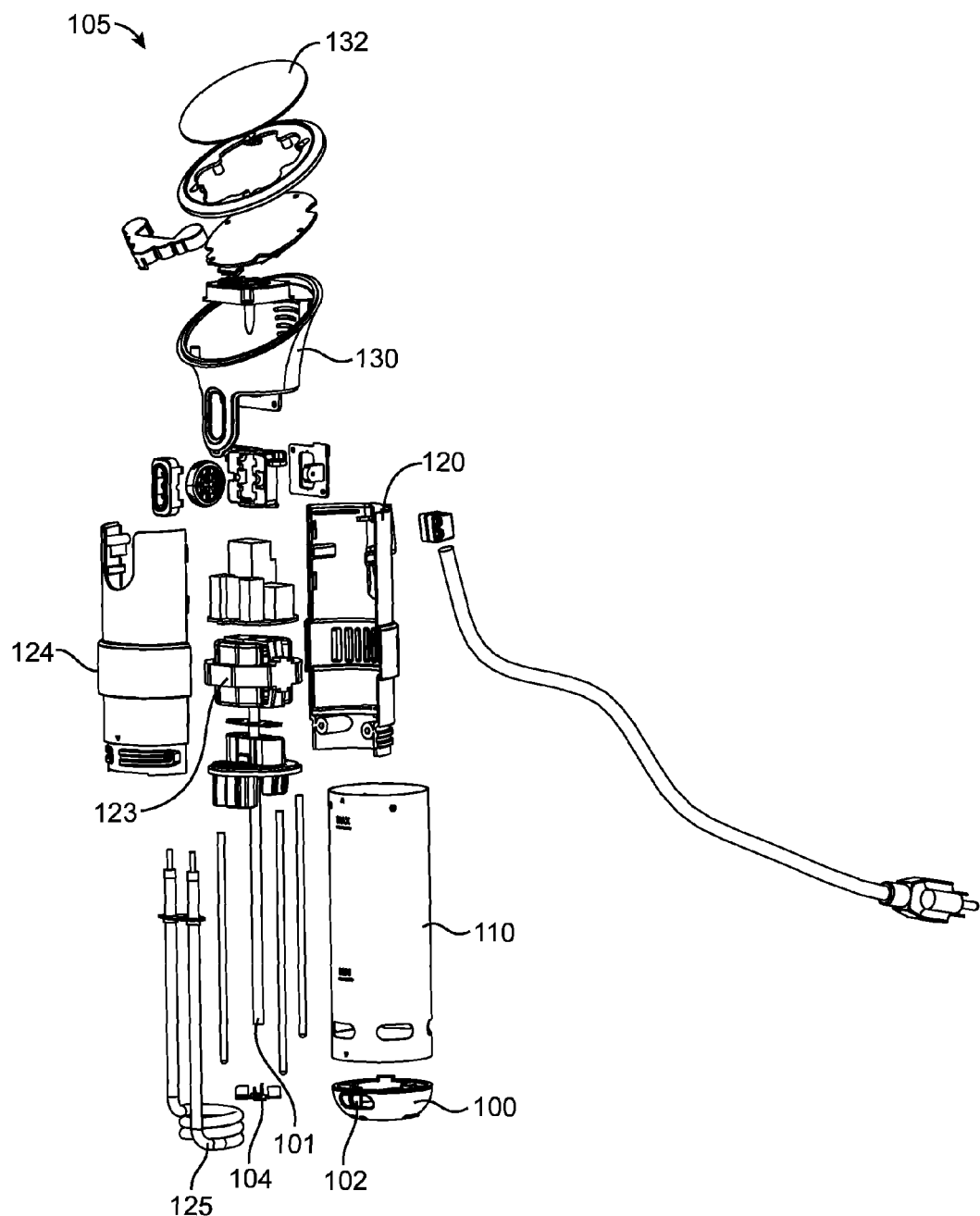
FIG. 3 illustrates a fluidic temperature control device in accordance with an example embodiment.

FIG. 3 illustrates components of at least one embodiment of a fluidic temperature control device 105. The device can include a lower portion 110. The lower portion 110 can be a removable, tool-less screw or clamp-on circulator pump other agitation device housing. Lower portion 110 can include heaters 125, drive shaft 101 and impeller 104. The lower portion 110 can be composed of stainless steel or other suitable materials. In one embodiment, the lower portion 110 can be a removable clamp-on on skirt. The lower portion 110 can be configured with one or more liquid intake (flow-in) openings 118. Alternatively, openings 118 can be liquid output (flow-out) openings. The device 105 can also include a liquid ejection (flow-out) cap 100 with one or more openings 102 on the side or bottom at the through which fluid can pass (as liquid intake (flow-in) or liquid output (flow-out)). Middle portion 120 can enclose motor and heater base 123 connected to electric heaters 125. Middle portion 120 can also comprise a fan (not shown) to blow out any steam that may be present. Middle portion 120 can include collar 124 including one or more openings to provide ventilation to motor and heater base 123. Device 105 can include an upper portion 130. The upper portion 130 can include a LCD display 132 with touch controls. Device 105 can be sealed against water/air and can be fully submersed for periods of time in the cooking vessel containing the fluid being heated by the device.

Figure 4:
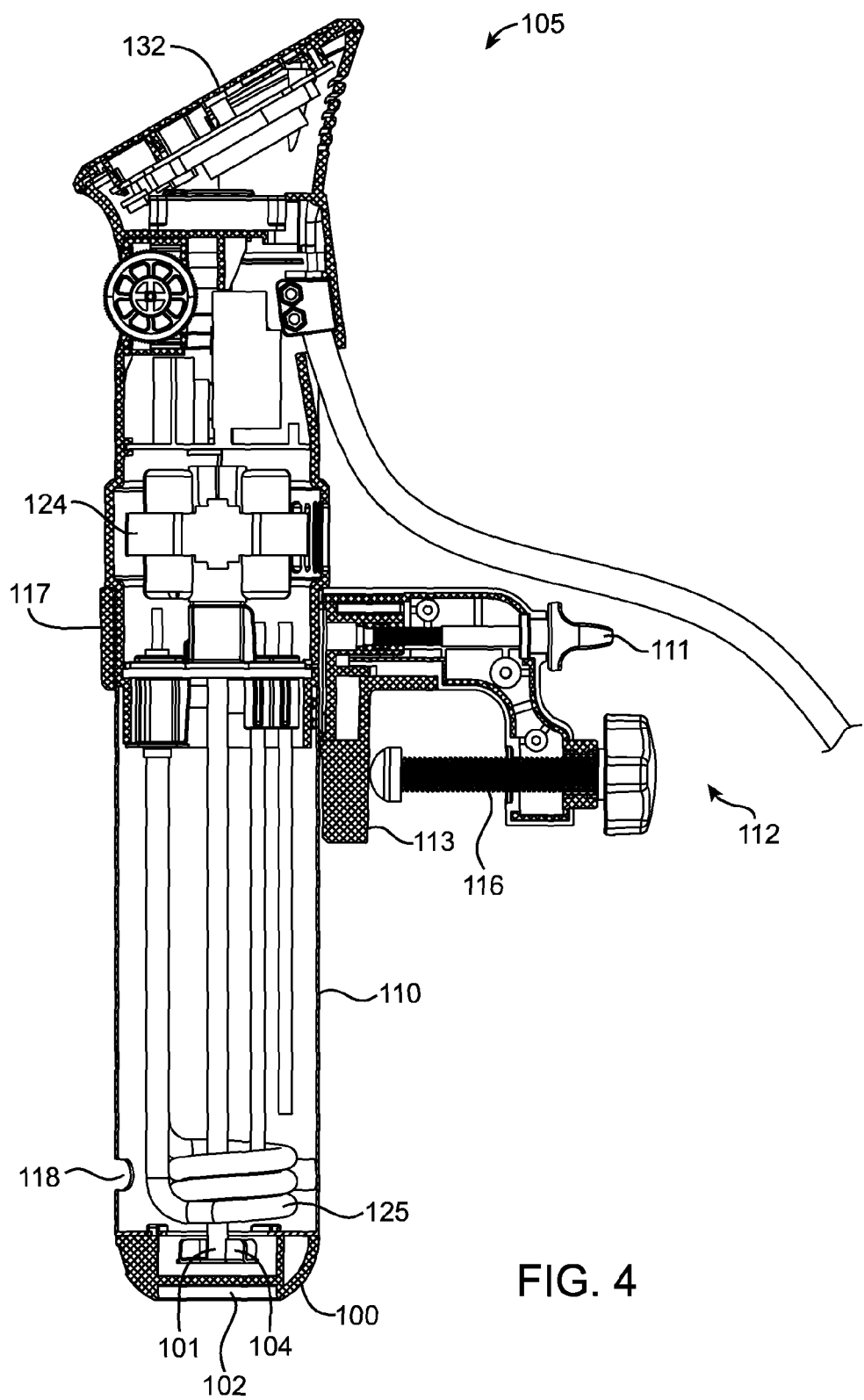
FIG. 4 is a cross-sectional view illustrating a fluidic temperature control device in accordance with an example embodiment.

FIG. 4 is a cross-sectional view illustrating an example embodiment of fluidic temperature control device 105 having a clamp 112. The clamp 112 can be configured to releasably secure the fluidic temperature control device 105 to a pot, or any container holding a fluid. The clamp 112 can have a collar 117 and an attachment portion 111 at the uppermost portion of the clamp. The collar 117 can circumferentially engage with device 105 by attachment portion 111. The attachment portion 111 can be spring operated and configured to enable the clamp 112 to attach to the fluidic temperature control device 105. The clamp 112 can further have a stationary engagement portion 113 configured to engage an inner portion of a pot. The clamp 112 can further have a moveable engagement portion 116 configured to engage an outer portion of the pot thereby securing the fluidic temperature control device 105 to the pot. The collar 117 can be positioned at any point along the fluidic temperature control device 105 to enable adjustment in the length of the lower portion 110 that is immersed in fluid of container 114.

Figure 5:
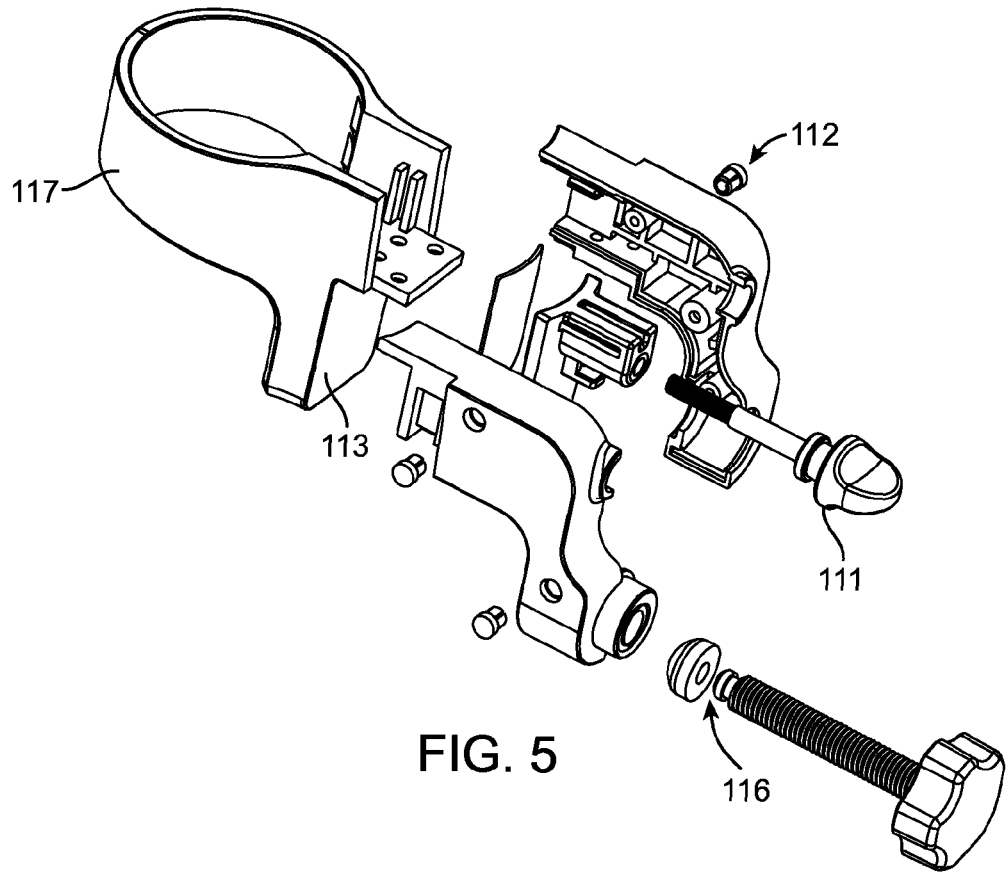
FIG. 5 and FIG. 6 illustrates a clamping mechanism for a fluidic temperature control device in accordance with an example embodiment.
Figure 6:
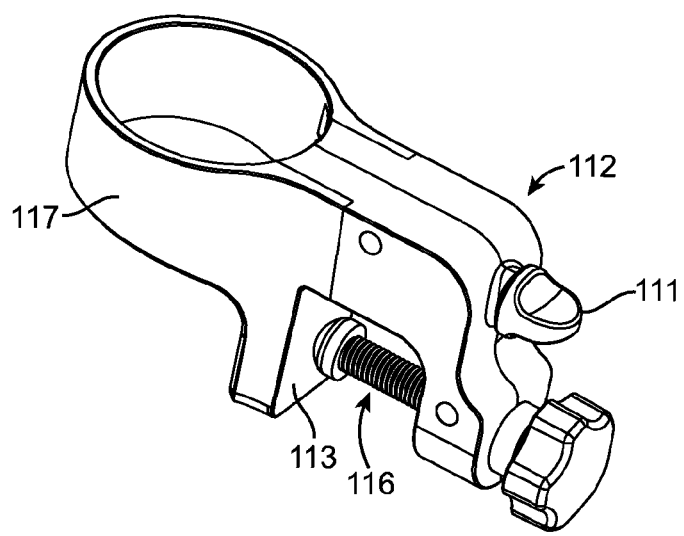

FIG. 5 and FIG. 6 illustrate an exploded view and assembled view of an example clamp 112 respectively. Clamp 112 can include a collar 117 to engage with a temperature control device (not shown). Collar 117 can be engaged by actuating attachment portion 111. Attachment portion 111 can be spring-loaded. When attachment portion 111 is actuated, collar 117 can be engaged with the temperature control device preventing movement of collar 117. Clamp 112 can also include a stationary engagement portion 113. Stationary engagement portion 113 can be configured to engage the inside wall of a container. Clamp 112 can also include a moveable engagement portion 116. Moveable engagement portion 116 can be configured to engage the outside wall of a container. Moveable engagement portion 116 can be actuated by a screw mechanism. In another embodiment, moveable engagement portion 116 can be spring-loaded.

Figure 7:
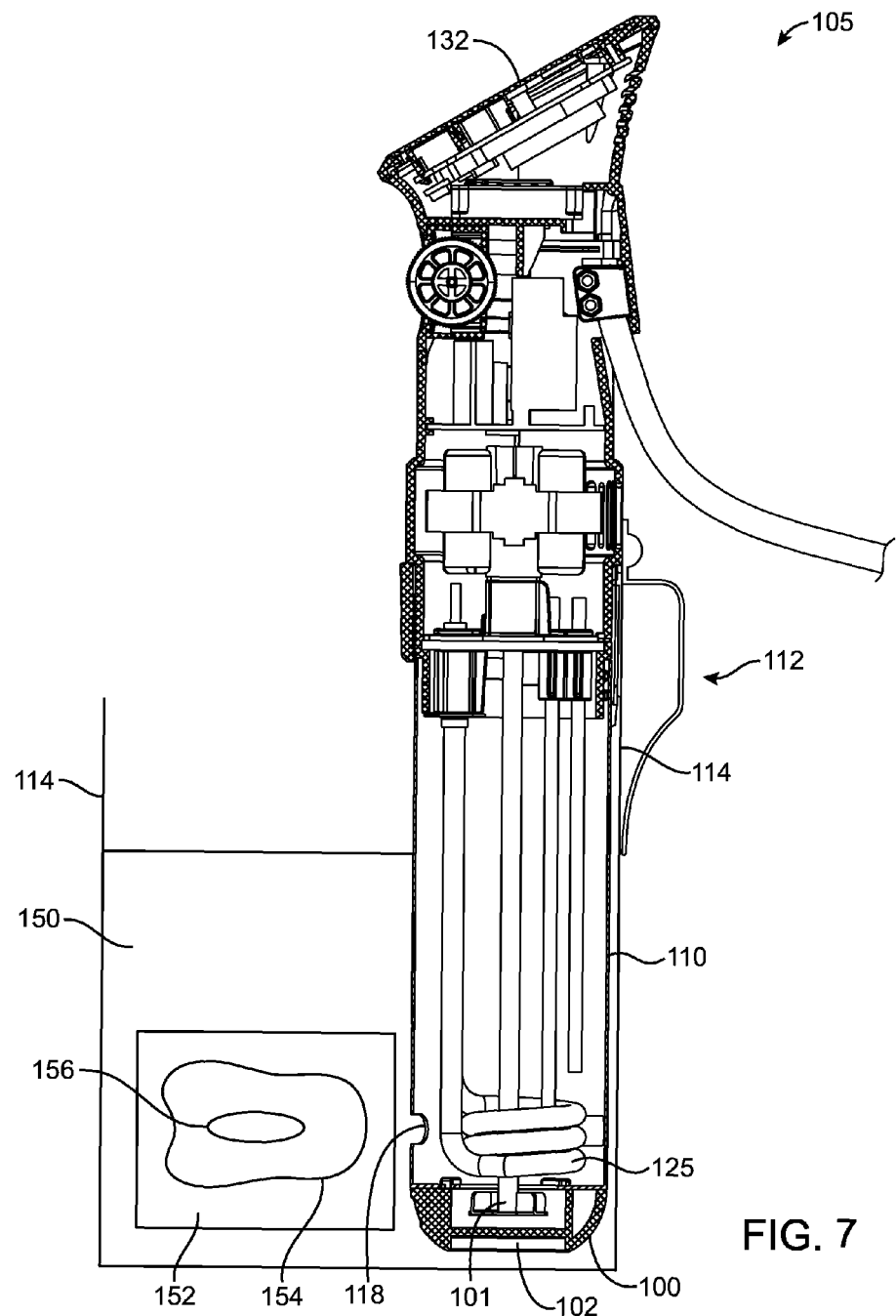
FIG. 7 is a cross-sectional view illustrating a fluidic temperature control device in accordance with an example embodiment.

FIG. 7 illustrates an example fluidic temperature control device in communication with a wireless temperature sensor. Device 105 is adjustably attached to container 114 containing fluid 150 (for example water). The temperature of fluid 150 can be regulated by device 105, as previously described. The wireless temperature sensor 156 can be placed proximate (or within) the food 154 within a sealed container 152 (for example, a plastic bag or plastic envelope) located in fluid 150. In another embodiment, the temperature sensor can be wired to and located at fluidic temperature control device 105.

Figure 8:
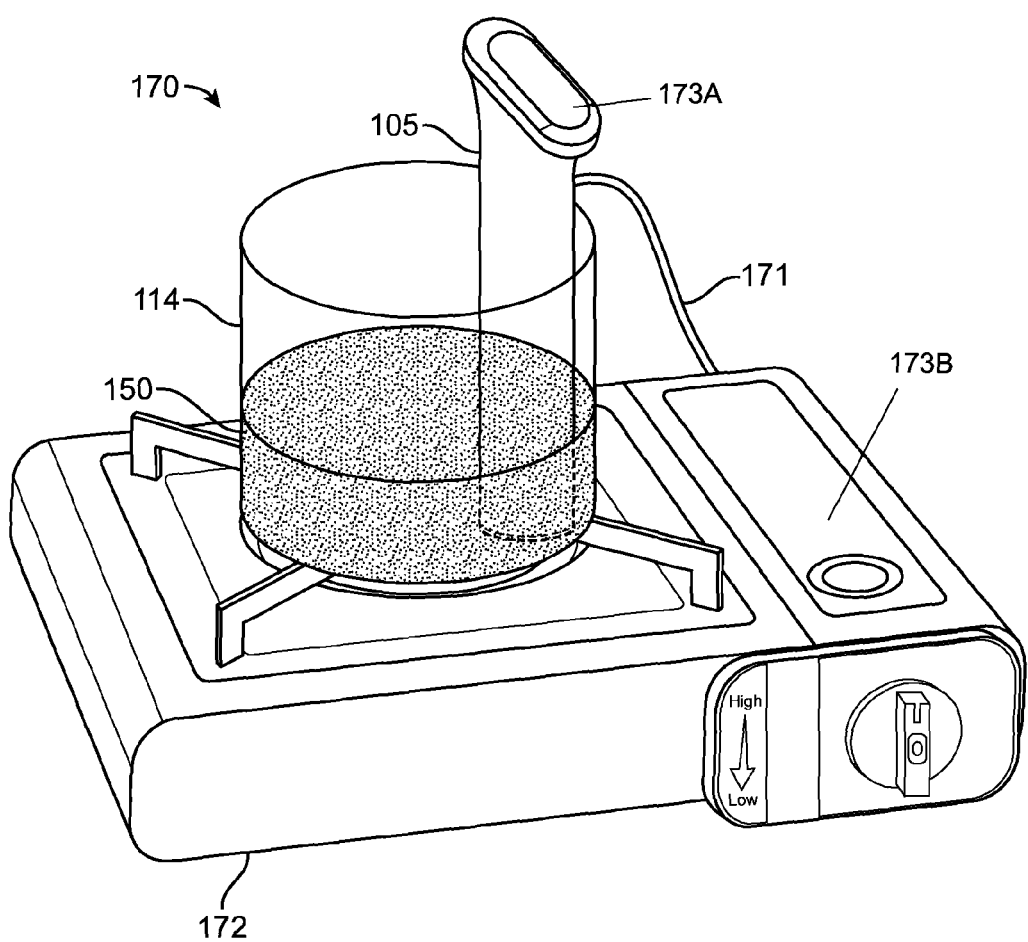
FIG. 8 illustrates a combination cooking range in accordance with an example embodiment.

FIG. 8 illustrates an example combination cooking range. Combination cooking range 170 can include a fluidic temperature control device 105 and one or more burners 172. The one or more burners can be an electric range, an electric cooktop, a gas range, a gas stove top, an electric hot plate, an induction cooktop, modular cooktop, or any other type of cooking surface where conventional cookware can be used. The fluidic temperature control device 105 can be in communication with the one or more burners 172 by cable 171. In at least one embodiment the communication between fluidic temperature control device 105 and the one or more burners 172 can be wireless.

In at least one embodiment the one or more burners 172 can be connected to controllers 173A and 173B. In at least one embodiment, controller 173A can be a primary controller and controller 173B can be a backup controller. In at least one embodiment, controller 173B can be a primary controller and controller 173A can be a backup controller. In at least one embodiment, only one controller is configured for use. The one or more burners 172 and fluidic temperature control device 105 can be communicatively coupled to Controllers 173A and 173B. In response to receiving a temperature reading a controller can modulate the heat output of burners 172. For example, device 105 can be set to a specific temperature, if a controller receives a temperature reading of less than the specific temperature, the controller can modulate the one or more burners 172 to increase the heat output. If a controller receives a temperature reading of more than the specific temperature, the controller can modulate the one or more burners 172 to decrease the heat output. In at least one embodiment a controller can be connected to fluidic temperature control device 105 and the command to modulate the heat output of the one or more burners 172 can be received at the more or more burners by cable 171 or wirelessly. In at least one embodiment, device 105 and the one or more burners 172 can each have a controller. In at least one embodiment, device 105 can include a controller. In at least one embodiment, one or more burners 172 can include a controller.

In at least one embodiment fluidic temperature control device 105 can receive a temperature reading from a thermometer device (as previously disclosed). In response to receiving a temperature reading, device 105 can actuate the agitation device. For example, device 105 can be set to a specific temperature, if a temperature reading of less than the specific temperature is determined, device 105 can actuate (at a higher speed) the agitation device to aid in increasing temperature of the fluid. If a temperature reading of more than the specific temperature is determined, device 105 can de-actuate (at a lower speed) the agitation device to aid in decreasing temperature of the fluid. In at least one embodiment the temperature of the heater of device 105 can be used to aid in increasing or decreasing the temperature of the fluid.

In at least one embodiment, modulating the one or more burners and actuating the agitation device can be configured in unison to increase or decrease the temperature to the specified temperature of the fluid in a more timely fashion.

Figure 9A:
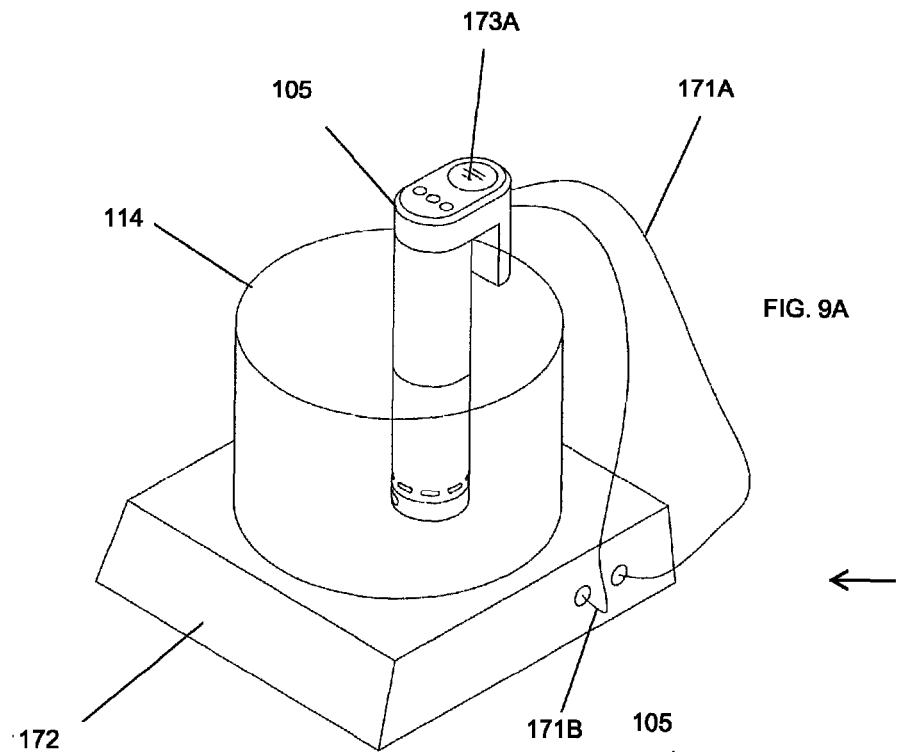
FIGS. 9A and 9B illustrate a combination cooking range in accordance with an example embodiment.

FIG. 9A illustrates an example combination cooking range where the controller is located in a fluidic temperature control device. Fluidic temperature control device 105 can include a controller 173A for configuring an agitation device located in fluidic temperature control device 105 and configured to modulate the one or more burners 172. Controller 173A can receive user input, for example of a temperature setting, and in response to the user input can actuate an agitation device of fluidic temperature control device 105 and modulate the burners 172. Controller 173A can transmit and receive temperature and control data through cables 171A and 171B.

Figure 9B:
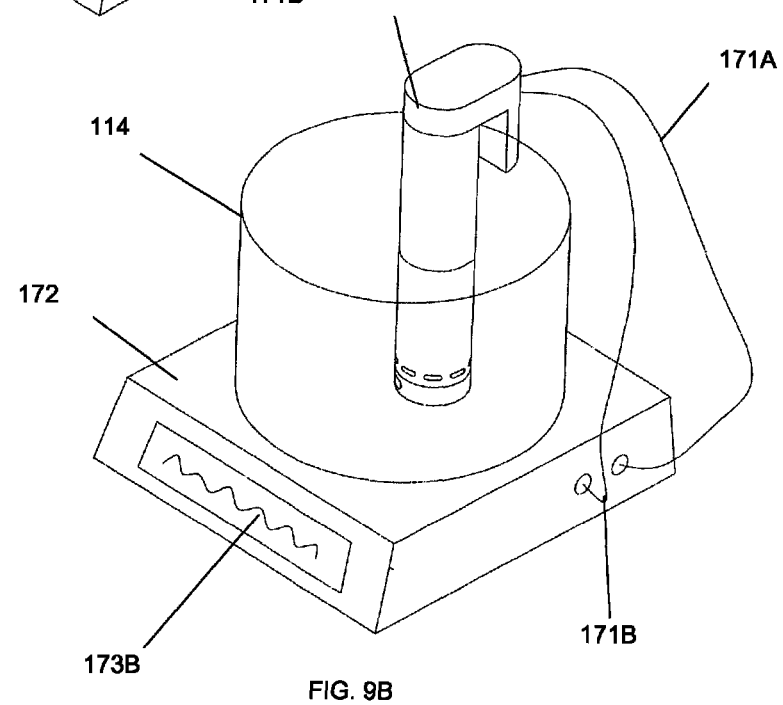

FIG. 9B illustrates an example combination cooking range where the controller is located in a burner. Burner 172 can include a controller 173B for configuring an agitation device located in fluidic temperature control device 105 and configured to modulate the one or more burners 172. Controller 173B can receive user input, for example of a temperature setting, and in response to the user input actuate an agitation device of fluidic temperature control device 105 and modulate the burners 172. Controller 173B can transmit and receive temperature and control data through cables 171A and 171B.

FIGS. 10A and 10B illustrate example agitation devices of a fluidic temperature control device. When used in combination with a burner, fluidic temperature control device 105 can be configured without any heating elements as shown in FIG. 10A and FIG. 10B. In at least one embodiment fluidic temperature control device 105 can include a heating element with or without the use of one or more burners. In at least one embodiment, device 105 can include cap 100 with one or more openings 102. In at least one embodiment, device 105 cannot include a cap and can be open-ended enabling full flow of liquid. As shown in FIG. 10A, an agitation device can include impeller 104 providing directional control of liquid, heated by one or more burners. In at least one embodiment, impeller 104 can draw liquid in to one or more openings 118 and expel liquid out of one or more openings 102. As shown in FIG. 10B, an agitation device can include a propeller for drawing liquid in openings 118 and out the open-end of device 105.

FIG. 11A illustrates an internal view of an example submersible pump agitation device of a fluidic temperature control device. FIG. 11B illustrates an internal view and housing of an example submersible pump agitation device of a fluidic temperature control device. When used in combination with a burner, fluidic temperature control device 105 can be configured without any heating elements as shown in FIG. 11A and FIG. 11B. In at least one embodiment fluidic temperature control device 105 can include a heating element with or without the use of one or more burners. Submersible pump 109 can draw liquid, heated by one or more burners, in with one or more liquid intake ports 107 and expel liquid out through one or more ejection ports 108. In at least one embodiment, device 105 can include multiple input openings 118 and output openings 102.

FIG. 12A illustrates an internal view of an example air pump agitation device of a fluidic temperature control device. FIG. 12B illustrates an internal view and housing of an example air pump agitation device of a fluidic temperature control device. When used in combination with a burner, fluidic temperature control device 105 can be configured without any heating elements as shown in FIG. 12A and FIG. 12B. In at least one embodiment fluidic temperature control device 105 can include a heating element with or without the use of one or more burners. In at least one embodiment, fluidic temperature control device 105 can include an air pump 115. Air pump 115 can include an air inlet 126 and an air outlet 127. Air outlet 127 can be U-shaped and include one or more openings 128. In at least one embodiment Air outlet 127 can be a circle, a semi-circle, one or more horizontal bars, one or more downward angled bars, or any other shape to promote agitation of a liquid. In at least one embodiment, air pump 115 can draw air through air inlet 126 and can agitate a liquid by forcing the air drawn in through the air inlet 126, out through openings 128 in air outlet 127.

Figure 13A:
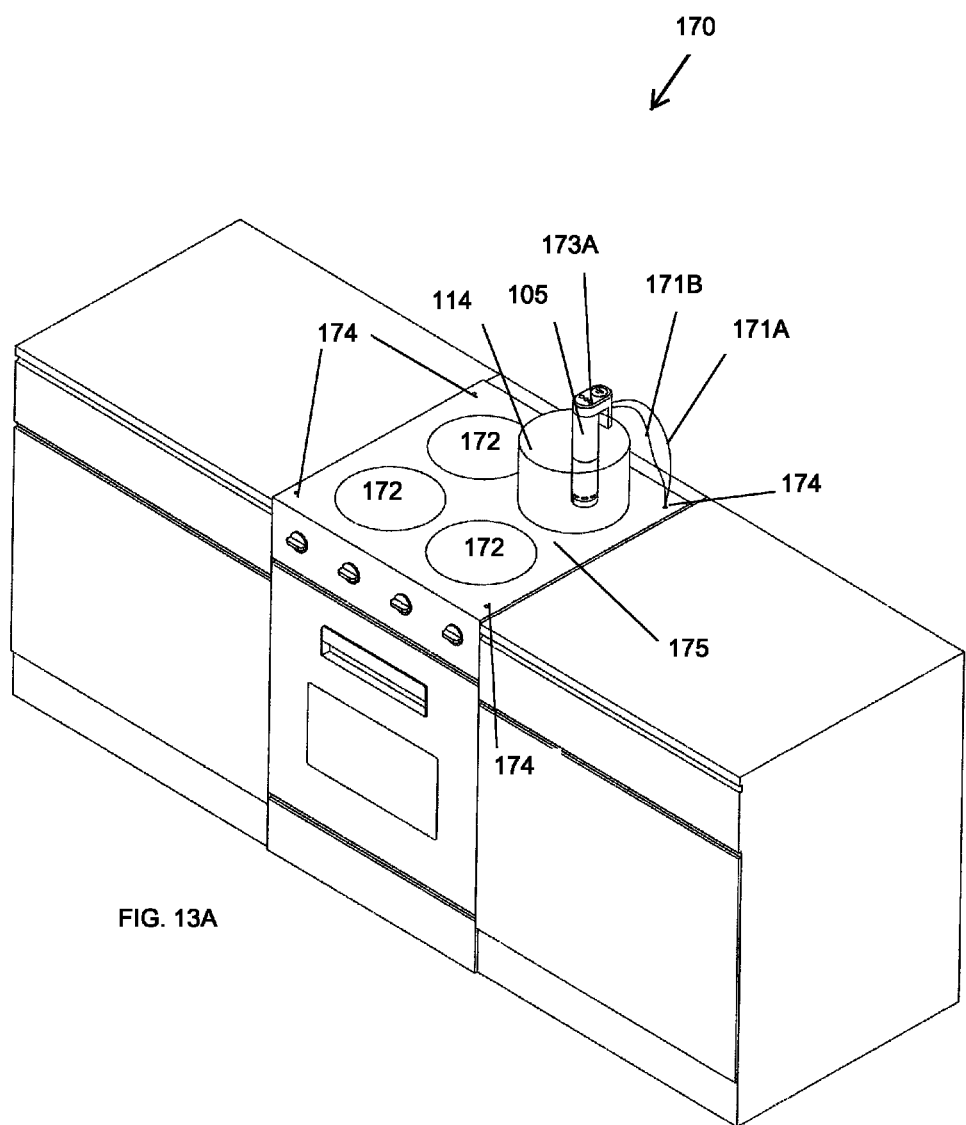
FIGS. 13A and 13B illustrate a combination cooking range in accordance with an example embodiment.
Figure 13B:
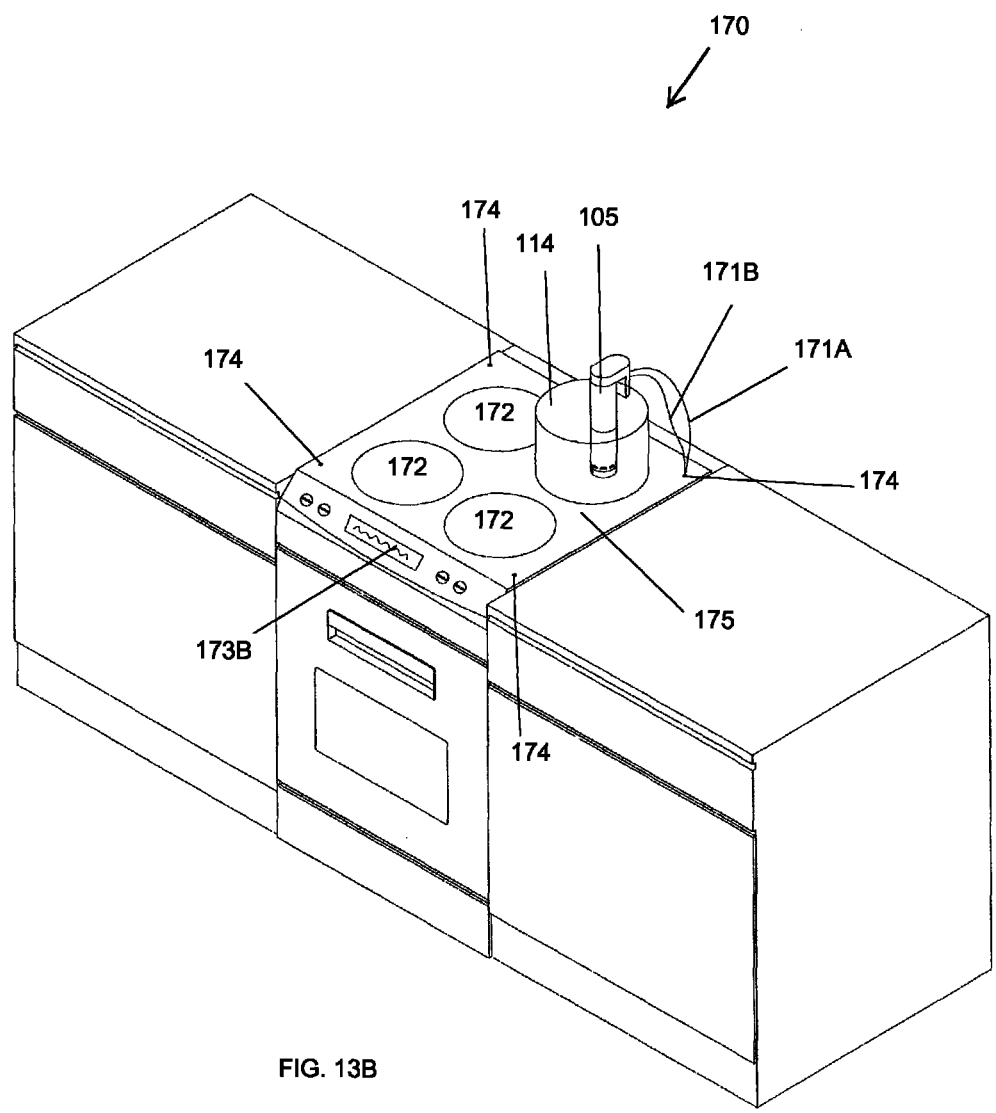

FIG. 13A illustrates an example combination cooking range with a controller included in a fluidic temperature control device. FIG. 13B illustrates an example combination cooking range with a controller included in a cooking range 175. When used in combination with a burner, fluidic temperature control device 105 can be configured without any heating elements. In at least one embodiment, when used in combination with a burner, fluidic temperature control device 105 can be configured with a heating element. Combination cooking range 170 can include a cooking range 175 with one or more burners 172. Container 114 can be configured for use with one or more burners 172. Fluidic temperature control device 105 can be releasably attached to container 114. In at least one embodiment shown in FIG. 13A, fluidic temperature control device 105 can include a controller 173A. Controller 173A can connect to one or more burners 172 through one or more connectors 174 by cables 171A and 171B. Controller 173A can transmit and receive temperature and control data through cables 171A and 171B. Controller 173A can be configured to actuate an agitator of device 105 and modulate the one or more burners 172. In at least one embodiment shown in FIG. 13B, cooking range 175 can include a controller 173B. Controller 173B can connect to device 105 through one or more connectors 174 by cables 171A and 171B. Controller 173B can transmit and receive temperature and control data through cables 171A and 171B. Controller 173B can be configured to actuate an agitator of device 105 and modulate the one or more burners 172.

In at least one embodiment device 105 and cooking range 175 can each include one or more heating elements. The one or more heating elements can work in unison or independently. For example, burner 172 can independently heat liquid in container 114. Container 114 can be removed from burner 172 and a heating element in device 105 can continue to heat the liquid in container 114. In at least one embodiment, a controller can modulate burner 172 and a heating element in device 105 to work in unison for precision heating of the liquid in container 114. For example, burner 172 can be used to rapidly increase liquid temperature. When a high temperature is reached, burner 172 can be lowered and heating element of device 105 can be modulated to bring the water to a precise temperature.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as can be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk™. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including HTTP servers, FTP servers, CGI servers, data servers, Java servers, and business application servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, or TCL, as well as combinations thereof. The server(s) can also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system can also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure can be provided as a computer program product including a nontransitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software can be via Internet download.

Based on the disclosure and teachings provided herein, it will be understood that other ways and methods of implementing the various embodiments described above are possible. The specification and drawings are illustrative and are not to be construed as limiting the scope of the following claims.

The invention claimed is:

1. A combination cooking range comprising:
   one or more burners communicatively coupled to a fluidic temperature control device and configured to support a container;
   the fluidic temperature control device including, a heater controller, a temperature sensor, a fluid agitation device, and a heating element, wherein the fluidic temperature control device is releasably attached to the container,
   wherein the temperature sensor is configured to control the heater controller to independently modulate a heat output of the one or more burners, and to independently modulate heat output of the heating element; and the temperature sensor is further configured to actuate the fluid agitation device.

2. The combination cooking range of claim 1, further comprising a display device and an input device coupled to the heater controller.

3. The combination cooking range of claim 2, wherein the display device is configured to render a display of the temperature fluidic temperature control device or render a display of the heat output of the one or more burners.

4. The combination cooking range of claim 1 wherein the one or more burners includes at least one of the electric element, inductive element or gas element.

5. The combination cooking range of claim 1, wherein the fluid agitation device includes at least one of a motorized stirrer, a pump, an air blower or an immersion stirrer.

6. The combination cooking range of claim 1, wherein the fluid temperature control device is configured for partial or full submersion into a fluid of the container.

7. The combination cooking range of claim 1, wherein the fluidic temperature control device includes a wireless radio transmitter/receiver in communication with a computing device.

8. The combination range of claim 1, wherein the fluidic temperature control device includes a clamp enabling attachment and removal from the container.

9. The combination cooking range of claim 1, wherein the combination cooking range is standalone or is embedded into a counter.

10. The combination cooking range of claim 1, further comprising:
    the heater controller controlling the one or more burners to increase heat output in response to the temperature sensor's detection of a predefined temperature.

11. The combination cooking range of claim 1, further comprising:
    the heater controller controlling the one or more burners to decrease heat output in response to the temperature sensor detecting a predefined temperature.

12. The combination cooking range of claim 1, further comprising:
    the fluid agitation device configured to increase actuation speed in response to the temperature sensor detecting a predefined temperature.

13. The combination cooking range of claim 1, further comprising:
    the fluid agitation device configured to decrease actuation speed in response to the temperature sensor detecting a predefined temperature.

14. A fluidic temperature control device which is releasably attachable to a container, the fluidic temperature control device comprising:
    a heater controller;
    a temperature sensor coupled to the heater controller,
    a fluid agitation device coupled to the heater controller and a first heating element,
    wherein the temperature sensor is configured to control the heater controller to modulate heat output of the first heating element;
    the temperature sensor is further configured to actuate the fluid agitation device; and the heater controller is configurable to control the heater controller to modulate heat output of a second heating element, the second heating element external to the fluidic temperature control device.

* * * * *